(12) United States Patent
Tischer

(10) Patent No.: US 7,203,533 B1
(45) Date of Patent: Apr. 10, 2007

(54) MULTIPURPOSE ANTENNA ACCESSORY FOR PROTECTION OF PORTABLE WIRELESS COMMUNICATION DEVICES

(75) Inventor: Steven Neil Tischer, Atlanta, GA (US)

(73) Assignee: BellSouth Intellectual Property Corp., Wilmington, DE (US)

( * ) Notice: Subject to any disclaimer, the term of this patent is extended or adjusted under 35 U.S.C. 154(b) by 502 days.

(21) Appl. No.: 09/929,921

(22) Filed: Aug. 15, 2001

(51) Int. Cl.
*H04M 1/00* (2006.01)
*H01Q 1/00* (2006.01)
*H01Q 1/40* (2006.01)

(52) U.S. Cl. .............. 455/575.8; 455/566; 455/575.3; 455/575.7; 343/787; 343/873

(58) Field of Classification Search ......... 343/700 MS, 343/702; 361/686; 132/293; 345/173; 455/90, 455/351, 575.1, 575.3
See application file for complete search history.

(56) References Cited

U.S. PATENT DOCUMENTS

| | | | |
|---|---|---|---|
| 5,014,346 A * | 5/1991 | Phillips et al. ........... 455/575.7 |
| D333,298 S | 2/1993 | Raslowsky et al. |
| D354,072 S | 1/1995 | Yatabe |
| D354,742 S | 1/1995 | Hamilton |
| D355,165 S | 2/1995 | Sakaguchi et al. |
| 5,436,954 A * | 7/1995 | Nishiyama et al. ......... 455/566 |
| D366,463 S | 1/1996 | Ive et al. |
| 5,489,924 A * | 2/1996 | Shima et al. ................ 345/173 |
| D372,898 S | 8/1996 | Shan |
| D377,786 S | 2/1997 | Jones et al. |
| 5,929,813 A * | 7/1999 | Eggleston ............ 343/700 MS |
| 5,933,772 A * | 8/1999 | Wolff ........................... 455/351 |
| 5,986,606 A * | 11/1999 | Kossiavas et al. ... 343/700 MS |
| D417,657 S | 12/1999 | Matsumoto |
| D421,744 S | 3/2000 | Ono |
| 6,118,986 A * | 9/2000 | Harris et al. ............. 455/575.3 |
| D432,099 S | 10/2000 | Loh et al. |
| 6,157,819 A * | 12/2000 | Vuokko et al. .......... 455/575.7 |
| 6,230,028 B1 * | 5/2001 | Shirakawa ................... 455/566 |
| 6,240,930 B1 * | 6/2001 | Yuhara ......................... 132/293 |
| D448,763 S | 10/2001 | Ikenaga |
| D449,606 S | 10/2001 | Lee et al. |
| 6,307,511 B1 * | 10/2001 | Ying et al. ................... 343/702 |
| D451,507 S | 12/2001 | Lin |

(Continued)

OTHER PUBLICATIONS

Declaration including Exhibit A filed by Applicant on Sep. 16, 2004.*

*Primary Examiner*—Fan Tsang
*Assistant Examiner*—Lisa Hashem
(74) *Attorney, Agent, or Firm*—Withers & Keys, LLC

(57) ABSTRACT

A protector for a portable wireless communication device that has a housing and a keypad. One embodiment of the protector may comprise a cover member that is pivotally attached to the housing and selectively pivotable between a first position wherein the cover covers the keypad and other positions wherein the keypad is exposed. The cover may be provided with one or more openings or notches to permit access to certain components on the keypad such as a thumbwheel, etc. without removing the cover member. The cover member may be provided with a latch to retain the cover member in position. If desired, an antenna may be coupled to the cover. The antenna may be physically coupled to the device's receiving and transmitting circuitry or it may be capacitively coupled thereto.

17 Claims, 13 Drawing Sheets

U.S. PATENT DOCUMENTS

| | | |
|---|---|---|
| D459,343 S | 6/2002 | Tischer |
| 6,430,400 B1* | 8/2002 | MacDonald et al. ....... 455/90.1 |
| D464,346 S | 10/2002 | Tischer |
| D467,581 S | 12/2002 | Tischer |
| D467,909 S | 12/2002 | Tischer |
| D467,916 S | 12/2002 | Tischer |
| D467,917 S | 12/2002 | Tischer |
| 6,542,721 B2* | 4/2003 | Boesen ................... 455/553.1 |
| 6,556,812 B1* | 4/2003 | Pennanen et al. ........... 343/702 |
| 7,031,744 B2* | 4/2006 | Kuriyama et al. ....... 455/550.1 |
| 2001/0012769 A1* | 8/2001 | Sirola et al. ................. 455/90 |
| 2002/0080074 A1* | 6/2002 | Wang ................. 343/700 MS |
| 2003/0021087 A1* | 1/2003 | Lunsford ................... 361/686 |
| 2004/0027300 A1* | 2/2004 | Kim et al. ................. 343/702 |

* cited by examiner

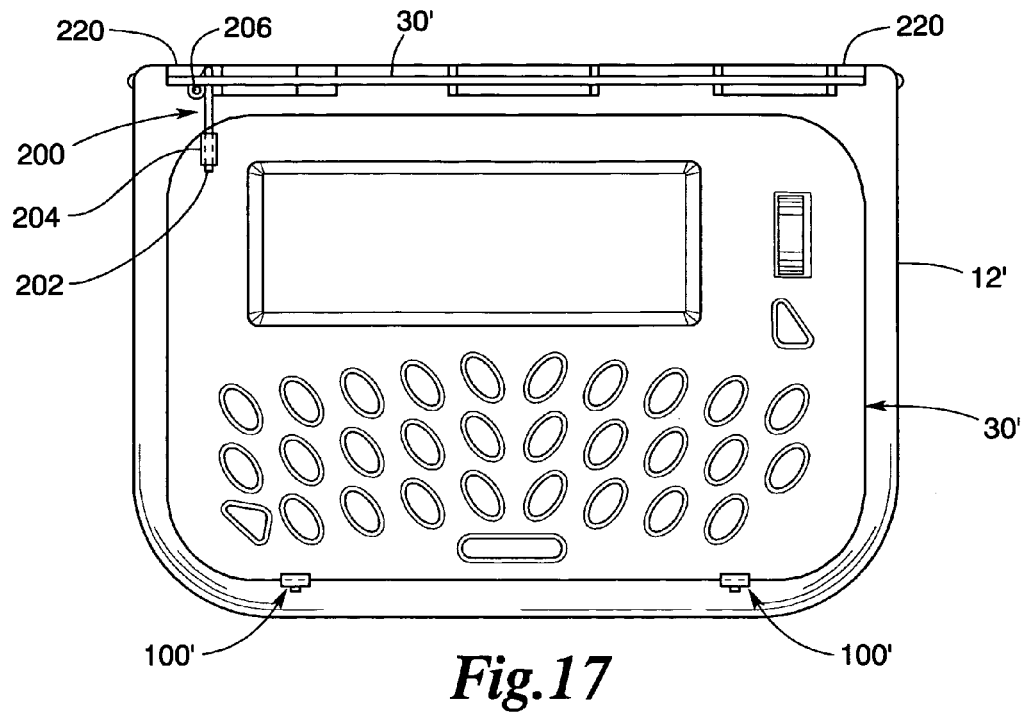
*Fig. 17*
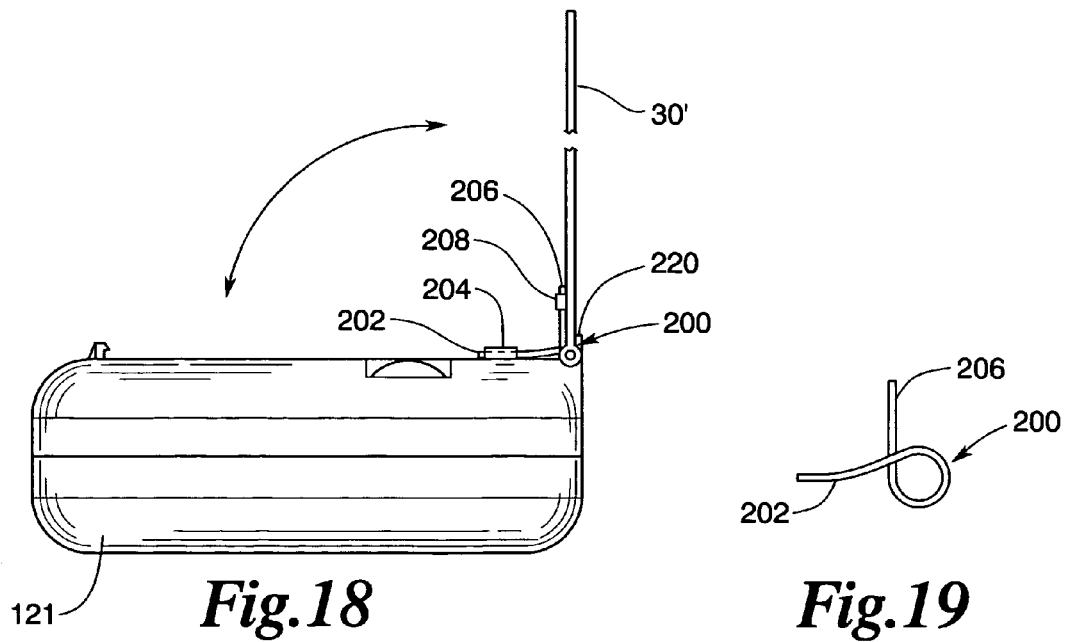
*Fig. 18*  *Fig. 19*

MULTIPURPOSE ANTENNA ACCESSORY FOR PROTECTION OF PORTABLE WIRELESS COMMUNICATION DEVICES

CROSS-REFERENCE TO RELATED APPLICATIONS

Not applicable.

FEDERALLY SPONSORED RESEARCH

Not applicable.

BACKGROUND OF THE INVENTION

1. Field of the Invention

The subject invention relates to antennas for portable electronic devices and, more particularly, to a protective cover and antenna arrangement for a portable wireless communication device.

2. Description of the Invention Background

The advent of portable wireless communication devices such as interactive pagers has forever changed the way people communicate. An interactive pager is a portable device that is typically equipped with a keypad and display that permits the user to compose text or numeric messages for example, to send and receive electronic messages, dictate messages to an operator who can send the message in text form, to send faxes, etc. Such devices are typically carried in a holder that is worn by the user. While some holders do provide a modicum protection for the pager, many individuals find such holders cumbersome and unattractive to wear. Such users typically carry the pager in their pocket or purse, thereby exposing the pager to inadvertent damage or contact with items that could lead to the creation of spurious messages. Other protective devices are usually too cumbersome to be discretely worn and, because they are readily detachable, they can easily be lost.

Also, service can at times be intermittent on such portable devices due to insufficient antenna capacity. Such devices are not well suited to the inclusion of a permanently protruding antenna because of its susceptibility to inadvertent damage and its detraction from the device's aesthetic appearance. Furthermore, due to the relatively compact size of such device, it cannot readily accommodate a retractable antenna.

Thus, there is a need for an antenna for a portable wireless communication device that is compact and that does not detract from the device's aesthetic appearance.

There is a further need for an antenna for a portable wireless communication device that is relatively inexpensive to manufacture and install and, if necessary, that can be removed from the device without the use of tools.

There is a further need for a protector for a portable wireless communication device that that is easy to install and that does not detract from the device's aesthetic appearance.

There is still another need for a protector for a portable wireless communication device that is detachable and that is relatively inexpensive to manufacture and install.

Another need exists for a protector for a portable wireless communication device that can permit the user to view the device's display while protecting the device's keypad.

Yet another need exists for a protector for a portable wireless communication device that permits access to the device's thumb wheel or other message scrolling actuator while protecting the remaining portion of the keypad.

There is another need for a protector for a portable wireless communication device that permits the user to view the device's display while protecting the device's display and keypad.

Another need exists for a protective cover for a wireless communication device that includes an antenna for improving the device's transmitting and receiving capabilities.

SUMMARY OF THE INVENTION

In accordance with one form of the present invention, there is provided a protector for a portable wireless communication device that has a housing and a keypad. In one embodiment, the protector includes a cover that is pivotally attached to the housing such that the cover may be pivoted to a first position wherein it covers the keypad and another position wherein the keypad is exposed. An antenna may be attached to the cover.

Another embodiment of the present invention comprises a portable wireless communication device that includes a housing, a keypad that is supported on the housing and a cover that is movably attached to the housing. An antenna member may be attached to the cover.

Another embodiment of the present invention comprises a portable wireless communication device that includes a housing that houses signal-receiving circuitry and signal-transmitting circuitry therein. An antenna is movably attached to the housing and is capacitively coupled to the signal-receiving circuitry and the signal-transmitting circuitry.

Yet another embodiment of the present invention comprises a method of protecting at least a portion of a keypad supported in the housing of a portable wireless communication device. The method includes movably affixing a cover to the housing such that the cover may be selectively moved from a first position wherein at least a portion of the keypad is covered to another position wherein the at least a portion of the keypad is exposed.

It is a feature of the present invention to provide a relatively inexpensive means for protecting at least a portion of a keypad of a wireless communication device when not in use.

It is another feature of the present invention to provide the above-mentioned means for protecting at least a portion of a keypad of a wireless communication device that can be easily attached and detached from the communication device to enable it to be replaced with another such protection means if desired.

It is another feature of the present invention to provide a means for enhancing the transmitting and receiving capabilities of a wireless communication device.

Another feature of the present invention is to provide a means for protecting at least portions of a wireless communication device when not in use and for enhancing the device's transmitting and receiving capabilities when in use.

Still another feature of the present invention is to provide apparatus that has the above-mentioned features that is relatively easy to manufacture and install and that does not detract from the device's aesthetic appearance.

Accordingly, the present invention provides solutions to various problems and shortcomings encountered when using and carrying various portable communication devices. Those of ordinary skill in the art will readily appreciate, however, that these and other details, features and advantages will become further apparent as the following detailed description of the embodiments proceeds.

BRIEF DESCRIPTION OF THE DRAWINGS

In the accompanying Figures, there are shown present embodiments of the invention wherein like reference numerals are employed to designate like parts and wherein:

FIG. 17 is a top view of another portable wireless communication device and protector of the present invention, with the protector in an upstanding position;

FIG. 18 is a right side elevational view of the portable wireless communication device and protector of FIG. 17;

FIG. 19 is a side view of a spring that is employed in the portable wireless communication device and protector depicted in FIGS. 17 and 18;

DETAILED DESCRIPTION OF THE EMBODIMENTS OF THE INVENTION

Figure 1:
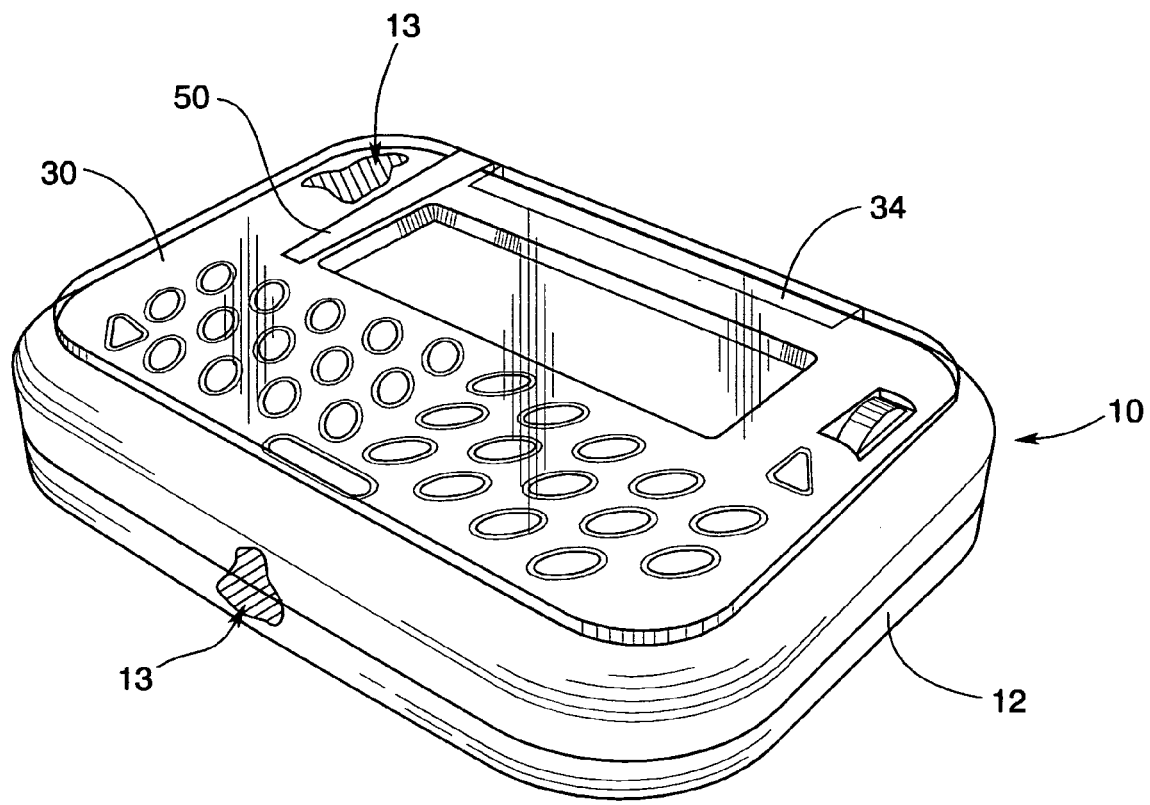
FIG. 1 is a perspective view of a portable wireless communication device having an embodiment of a protector of the present invention attached thereto.
Figure 2:
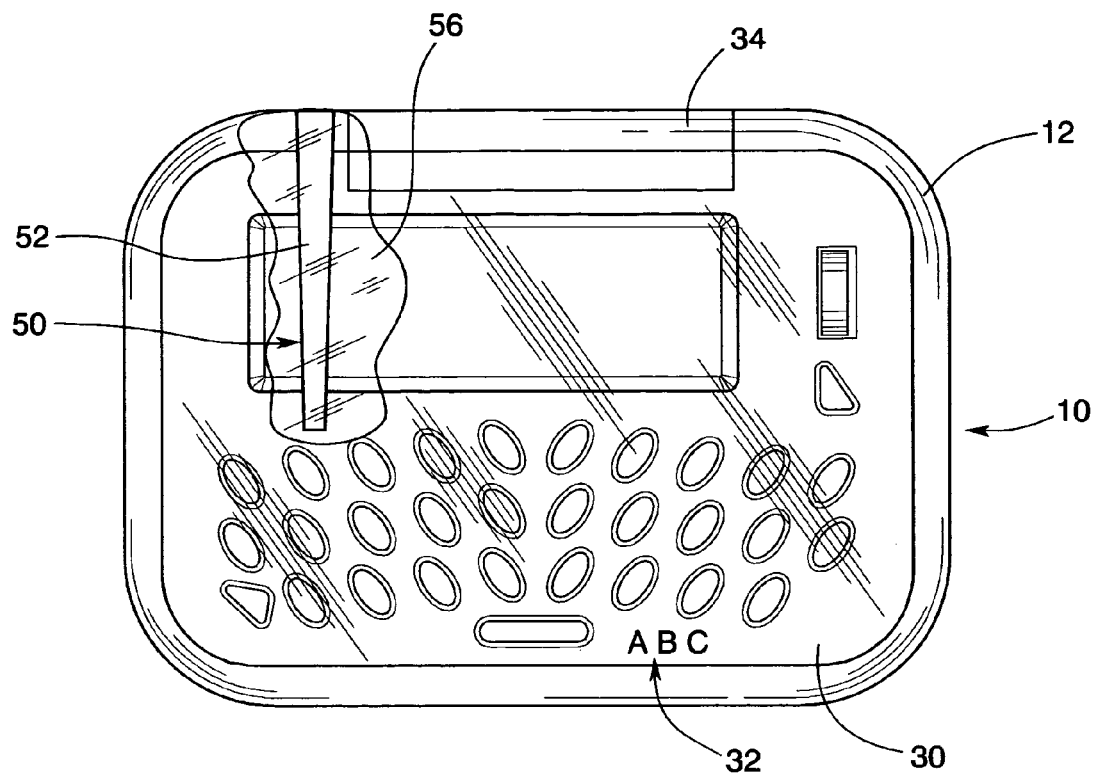
FIG. 2 is a top view of the portable wireless communication device and the protector of FIG. 1.

Referring now to the drawings for the purposes of illustrating the present preferred embodiments of the invention only and not for the purposes of limiting the same, the Figures show a portable wireless communication device such as an interactive pager 10. While the interactive pager 10 depicted in the Figures is similar to those interactive pagers supplied by BellSouth Corporation of Atlanta, Ga., those of ordinary skill in the art will readily appreciate that the various embodiments of the present invention may be effectively used with interactive pagers manufactured by other entities. Furthermore, various embodiments of the present invention may find utility when used in connection with a variety of portable electronic devices that have signal-receiving and signal-transmitting components and that may require selective protection of various actuation components thereof and enhancement of the device's signal-receiving and signal transmitting capabilities. Accordingly, the protection afforded hereby to the various embodiments of the present invention should not be limited to the specific type of portable wireless communication devices depicted herein.

Figure 5:
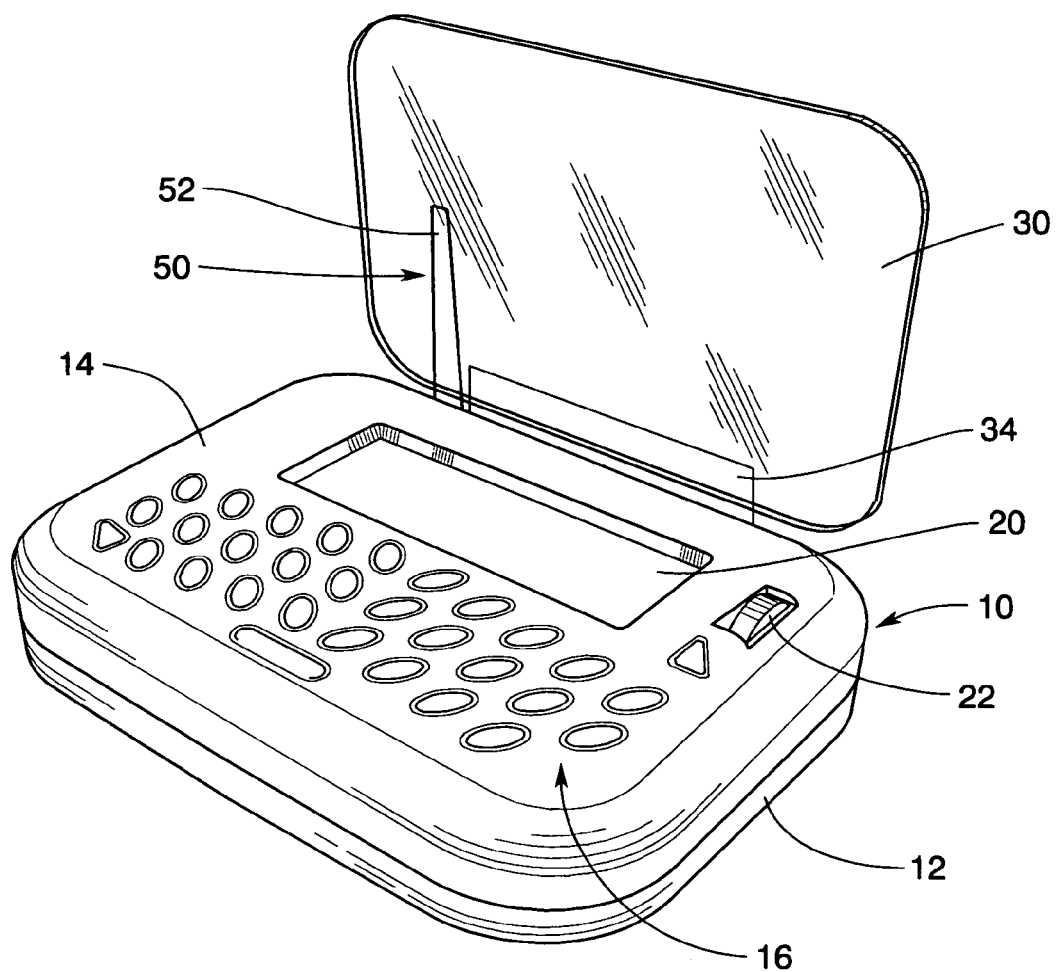
FIG. 5 is another perspective view of the portable wireless communication device of FIGS. 1–4 with the protector thereof in a second position.
Figure 6:
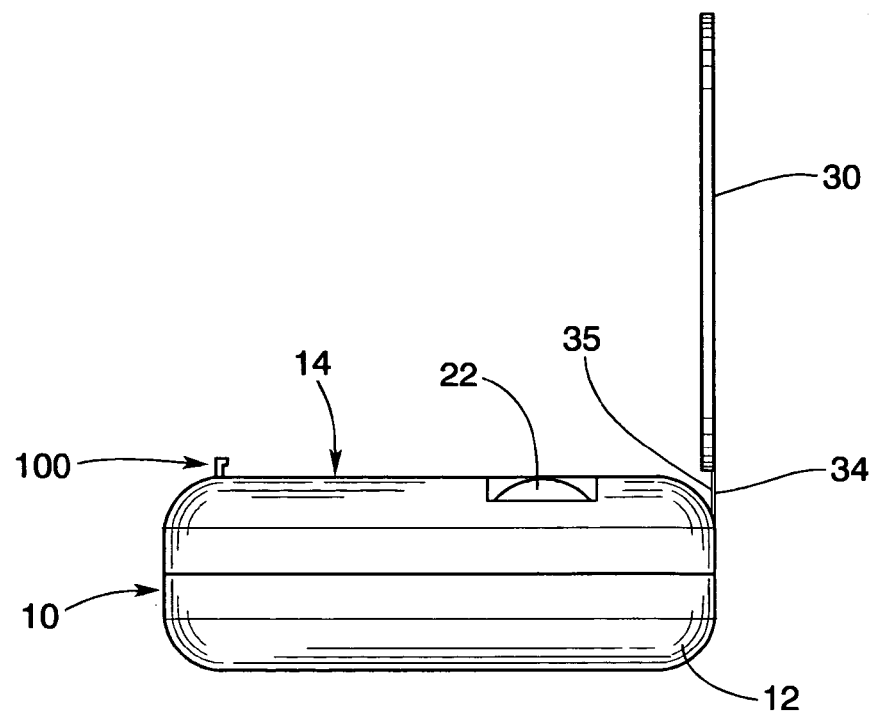
FIG. 6 is a right side elevational of the portable wireless communication device and protector depicted in FIG. 5.

Turning to FIGS. 1–7, the portable wireless communication device or interactive pager 10 has a housing 12 that has a top surface 14 that supports a keypad, generally designated as 16. The word "keypad" as used herein may encompass the layout of buttons or keypads such as those depicted in the Figures, and may also encompass any manually actuatable button, switch, etc. As can be seen in FIG. 5, in this embodiment, the housing 12 further supports a display 20 for displaying received messages and a thumbwheel 22 for permitting the user to scroll through the messages. The housing 12 further supports an internal antenna means, generally designated (in graphic form) as 24. The construction and operation of the internal antenna means is known in the art and therefore will not be discussed in detail herein.

As can also be seen in FIGS. 1–7, an embodiment of the present invention includes a protector or means for selectively covering the keypad or portions thereof in the form of a cover member 30 that is movably affixed to the housing 12. In one embodiment, the cover member 30 is fabricated from a polymer material that may be translucent or transparent. The cover may, for example, have opaque portions and transparent portions if desired. In addition, the housing may have a first color, generally designated as 13 and the cover member 30 may also provided with the color 13. It is conceivable, however, that those of ordinary skill in the art could fabricate the cover member 30 from other materials and in colors that are dissimilar from the color of the housing 12 without departing from the spirit and scope of the present invention. If desired, the cover member 30 may have indicia 32 printed thereon which may comprise, for example, operating instructions, a company logo, advertising, etc.

The cover member 30 may be pivotally attached to the housing 12 by a piece of commercially available adhesive tape 34. When adhesive tape 34 is employed, another piece of commercially available adhesive tape 35 may be applied to the portion of the adhesive tape 34 that is exposed to mask off the sticky portion of the tape 34 to prevent it from collecting dust, dirt, etc. See FIG. 6.

Figure 8:
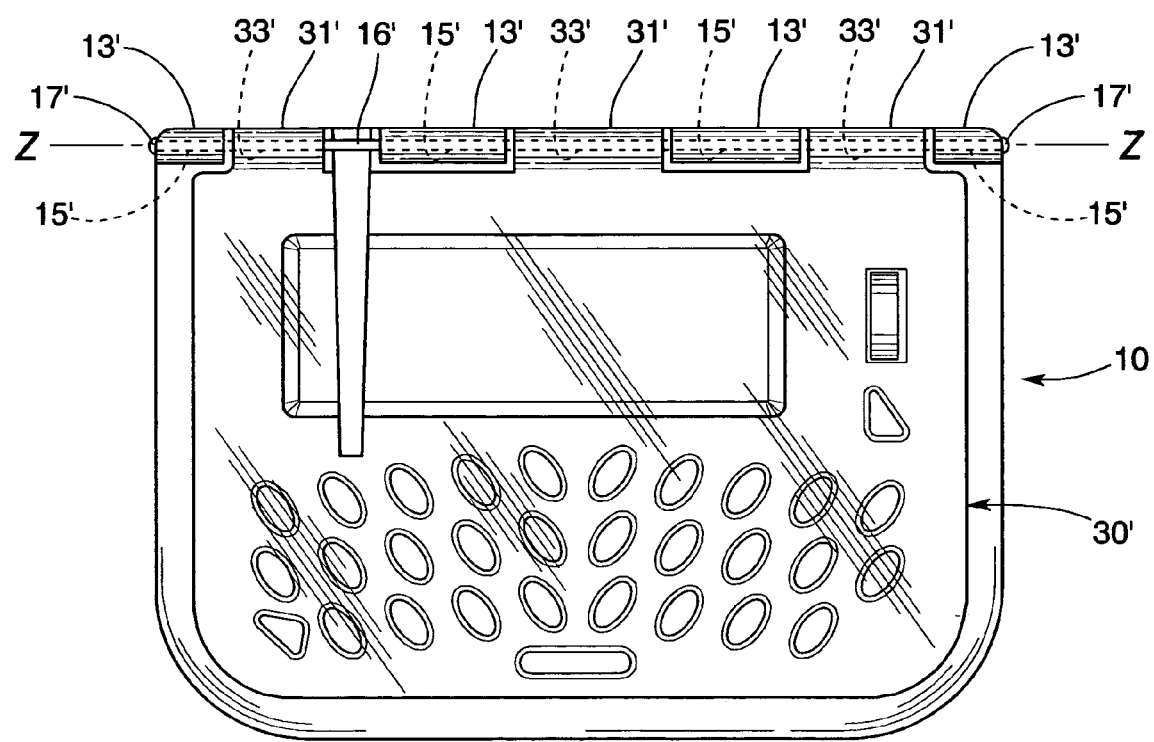
FIG. 8 is a plan view of another portable wireless communication device and protector of the present invention, with the protector thereof in a first position.
Figure 9:
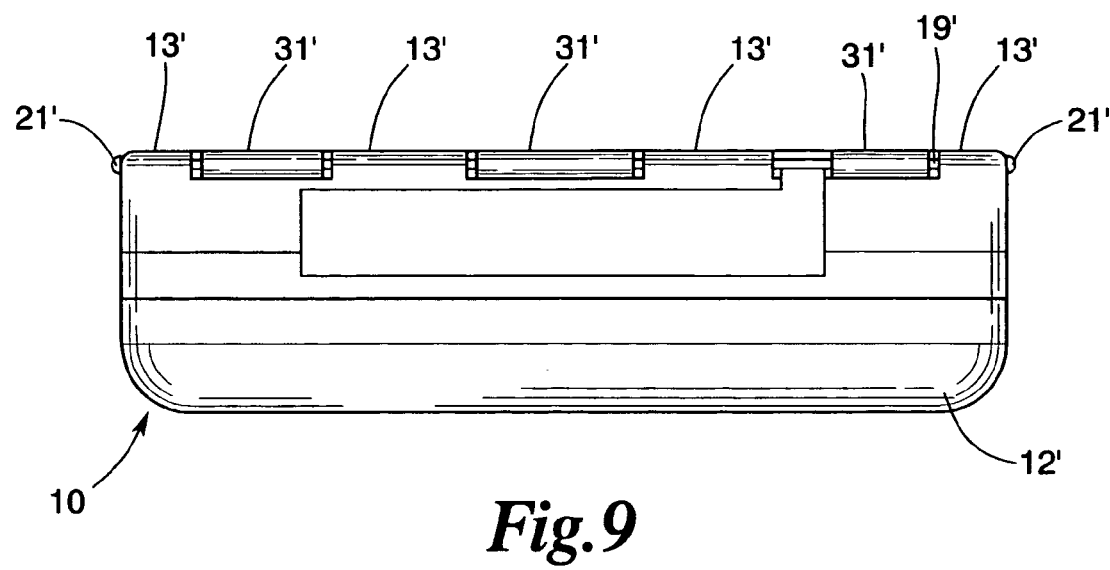
FIG. 9 is a rear view of the portable wireless communication device and protector depicted in FIG. 8.
Figure 10:
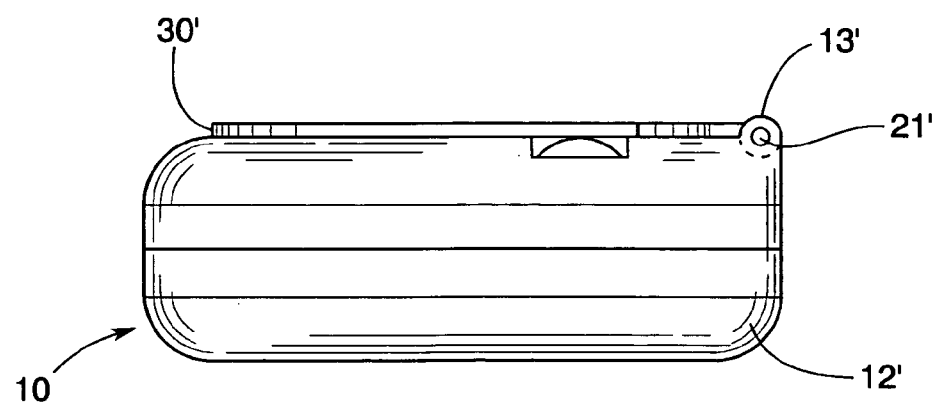
FIG. 10 is a right side elevational view of the portable wireless communication device and protector of FIGS. 8 and 9.
Figure 11:
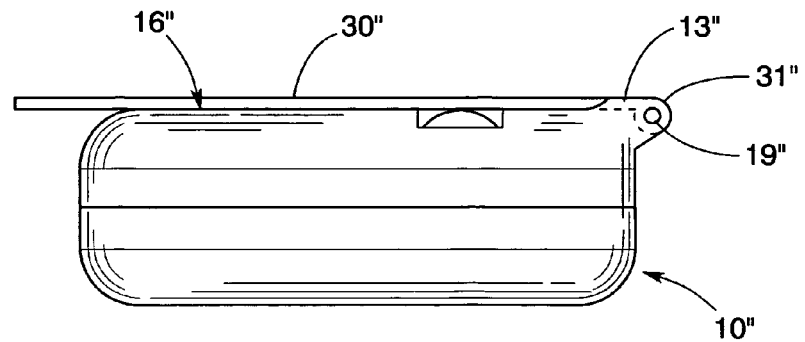
FIG. 11 is a right side elevational view of a portable wireless communication device and protector of the present invention with the protector in a first position.
Figure 12:
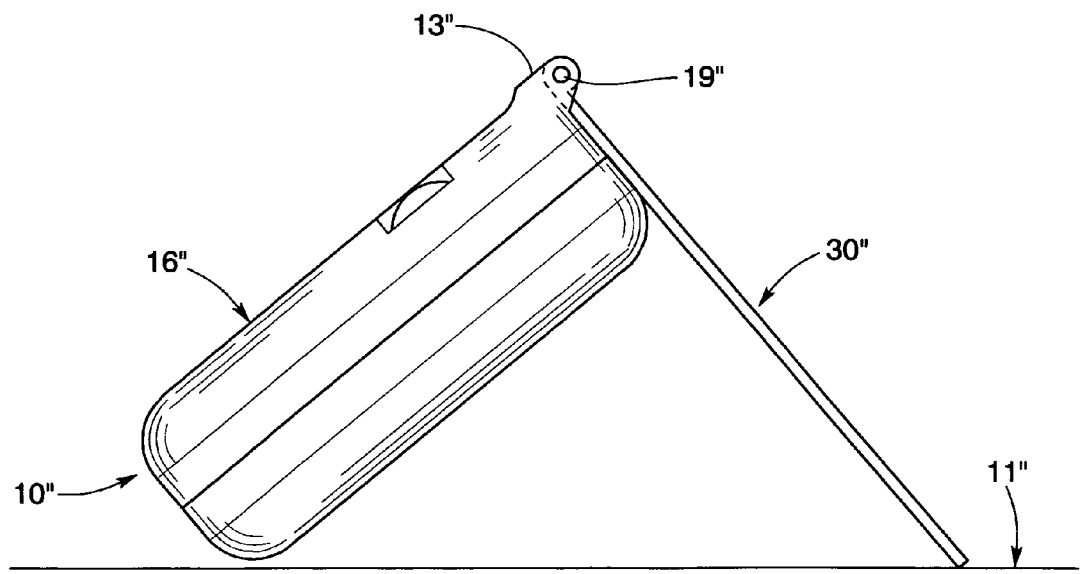
FIG. 12 is another right side elevational view of the portable wireless communication device of FIG. 11 with the protector thereof in another position supporting the communication device on a surface.
Figure 13:
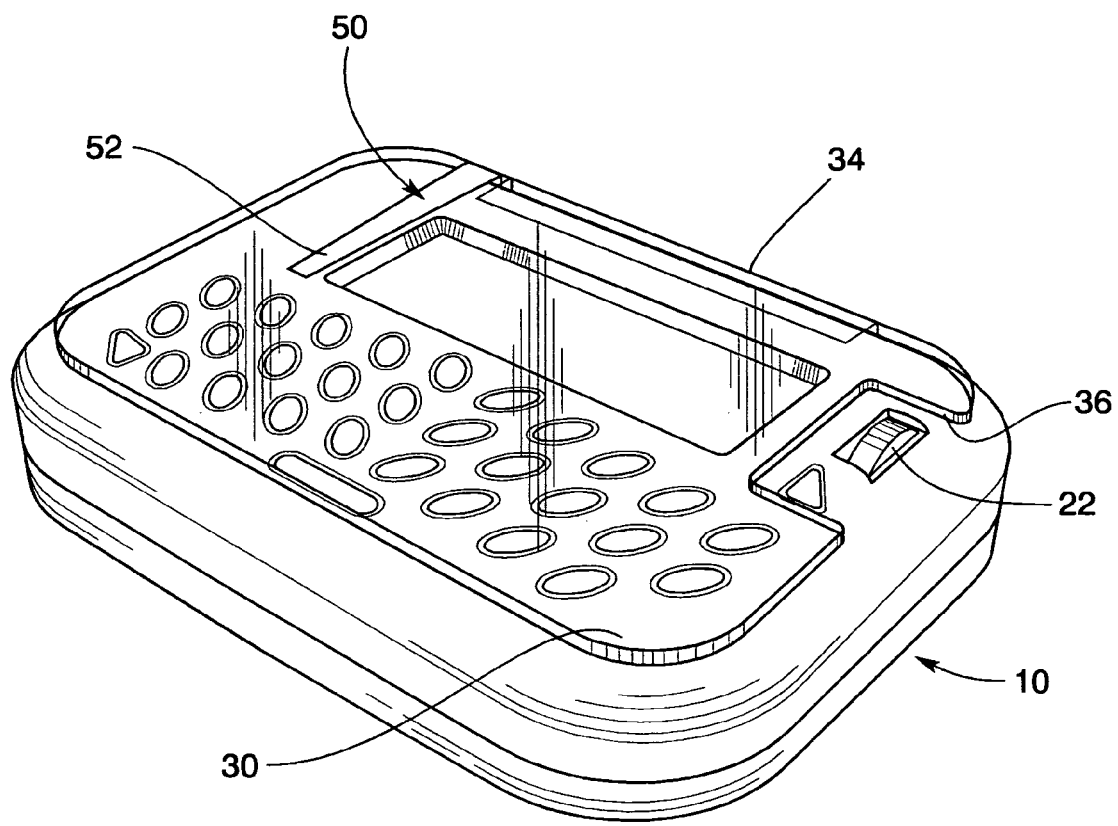
FIG. 13 is a perspective view of a portable wireless communication device and another protector of the present invention.

In the alternative, as shown in FIGS. 8, 9, and 10, the cover member 30' may be provided with one or more hinge bosses 31' that may be integrally formed with the cover member 30' or otherwise attached thereto by, for example, adhesive material, welding, etc. As can be seen in those Figures, the hinge bosses 31' are sized to pivot between corresponding bosses 13' provided on the housing 12'. Those of ordinary skill in the art will appreciate that the bosses 13' may be integrally molded with the housing 12' or otherwise attached thereto with adhesive, etc. Bosses 13' each have a hole 15' therethrough for receiving a hinge pin 19'. Likewise, the bosses 31' have holes 33' therethrough for receiving the hinge pin 19'. Hinge pin 16' extends through the bosses 13' and 31' to pivotally attach the cover member 30' to the housing 12' to enable the cover member 30' to pivot about pivot axis "Z—Z" defined by the hinge pin 19'. Hinge pin 19' may be provided with enlarged end portions 21' to retain it in position. In one embodiment, the hinge pin 19' is sized relative to holes 15' and 33' to create a sufficient amount of internal friction to establish a "frictional clutch" feature for retaining the cover member 30' in an upright position if desired. The hinge pin 19' may be fabricated from metal wire, plastic, etc. It will be further appreciated that a second hinge could be provided in the cover member to permit a main protective cover portion to be folded around the back of the device. This "double jointed" cover arrangement could form an angled stand for supporting the device on a surface. For example, as shown in FIGS. 11 and 12, the housing 12" of the communication device 10" may be provided with bosses 13" to support a cover member 30" that can be pivoted from a first position (FIG. 11) wherein the cover member covers the key pad 16" of the device 10" to a second position (FIG. 12) wherein the cover member 30" may be pivoted to act as a prop or stand for propping up or supporting the device 10" on a surface 11". In this embodiment, the cover member 30" is provided with bosses 31" to enable a hinge pin 19" to pivotally attach the cover member 30" to the housing 12" in the manner described above.

In the embodiment of FIGS. 1–7, the cover member 30 is sized such that when it is in a first position, it covers the keypad 16, including the thumbwheel 22. In another embodiment shown in FIGS. 13–16, a notch 36 may be provided in the cover member 30 to permit the user to access the thumbwheel 22 without having to move the cover and exposing the keypad 16. Thus, if the cover member 30 is transparent, the user can view the display through the cover member 30 and scroll down through the messages without moving the cover member 30 to another position wherein the keypad is exposed. To enhance the aesthetic appearance of the device, the cover member 30, may be fabricated with a desire hue, yet still be relatively transparent to permit viewing of the display and keypad. It will be further appreciated that portions of the cover member 30 may be opaque, while other portions may be transparent.

Various embodiments of the present invention may also include a means for enhancing a transmitting the device's signal transmitting and signal receiving ability in the form of an antenna 50. Those of ordinary skill in the art will appreciate that, even though the device may have some internal antenna components, the use of the antenna 50 as described herein with further enhance the signal transmitting and signal receiving capabilities of that internal antenna.

Figure 3:
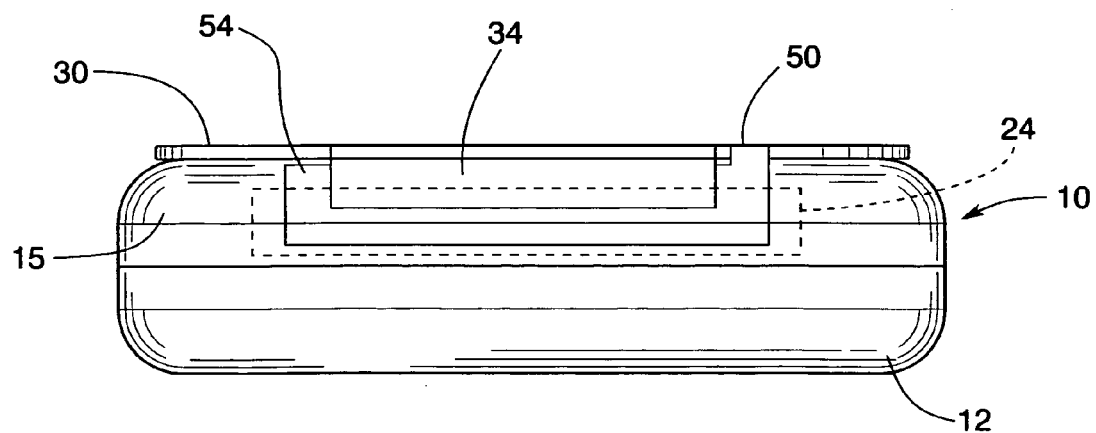
FIG. 3 is a rear elevational view of the portable wireless communication device and protector of FIGS. 1 and 2.
Figure 4:
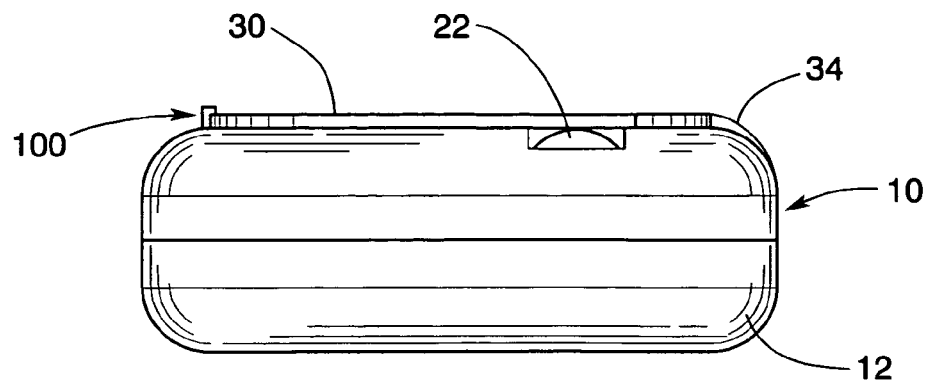
FIG. 4 is right side elevational view of the portable wireless communication device and protector of FIGS. 1–3.
Figure 7:
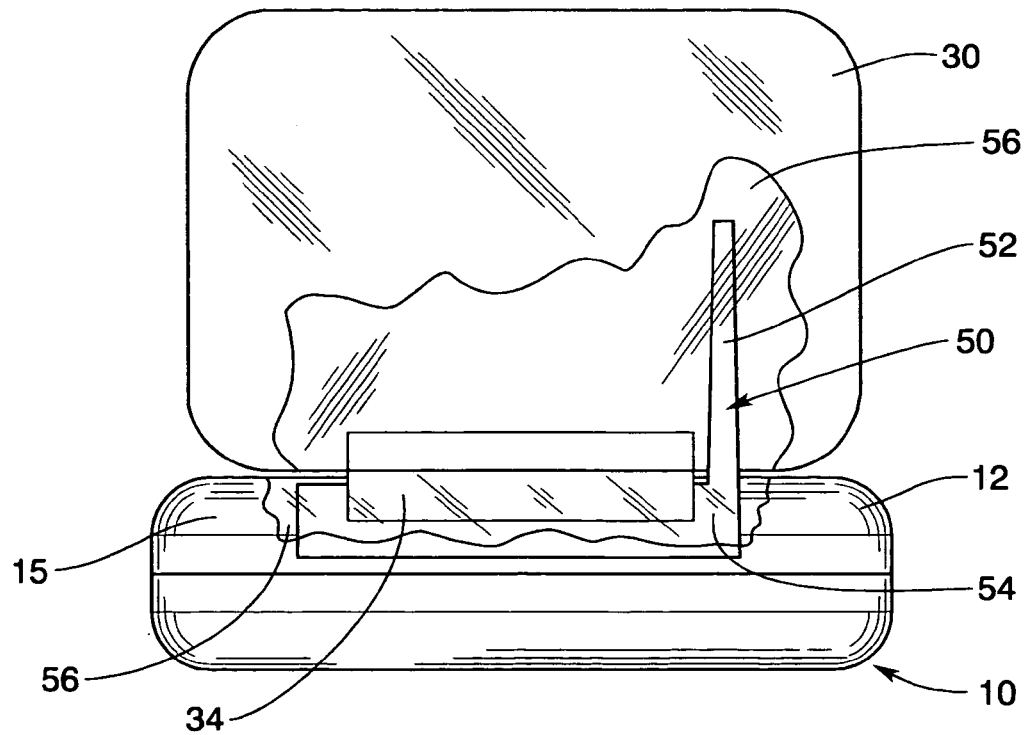
FIG. 7 is a rear elevational view of the portable wireless communication device and protector depicted in FIGS. 5 and 6.

In one embodiment, the antenna 50 is fabricated from metallic tape. For example, antenna 50 may be fabricated from standard aluminum duct tape or any other conductive element, including conductive plastic, in which case the look of the cover could be changed into an attractive consumer device. One type of aluminum duct tape that may be successfully employed for example is manufactured by Nashua Tape Products for the heating and cooling industry for sealing ductwork. In particular, the Nashua 322 Aluminum Foil backed duct tape UL 181A-P; 2.5 inch by 180 feet, 4.8 mil tape (UPC# 033656309005) or equivalent would suffice. However, other forms of antennas could be successfully employed. In the embodiment of FIGS. 1–7, the antenna 50 comprises a first portion 52 and a second portion 54 that are fabricated from a single piece of conductive material. The first portion 52 is attached to the cover member and the second portion 52 is attached to a rear surface 15 of the housing member 12 which is adjacent to the internal antenna 24. As can be seen in FIGS. 3 and 7, the rear portion 54 of the antenna 50 extends along the rear surface 15 of the housing 12, such that the shape of the antenna roughly resembles an "L". Thus, in this embodiment, the largest portion of the antenna 50 extends along the rear surface 15 of the housing 12 and is in a position that is adjacent to the internal antenna 24.

It will be appreciated that, in this embodiment, the antenna 50 is not directly physically coupled to the internal antenna 24. Instead, in this embodiment, the second portion 54 is "capacitively coupled" to the internal antenna 24. That is, the second portion of the antenna is located such that it is electromagnetically coupled to the internal antenna 24 without actually being physically coupled thereto. It is conceivable, however, in other embodiments that, depending upon the composition of the antenna 50, the antenna 50 may actually be physically attached to the internal antenna 24.

The antenna 50 may be "tuned" to the operating frequencies of the device by matching the conductive part of the protruding antenna length to some fraction of the desired reception and transmission wavelength. There are simplistic formulas to aid in this design, some dating back to the beginning of the radio frequency transmission industry. As an example, if the desired reception frequency of the device is 800 Megahertz (800 million oscillations per second) then one of the most common formulas (wavelength in feet=984/ frequency in megahertz) may be used to arrive at an antenna length of 984/800 or 1.23 feet long. In actual practice, that full wavelength of an antenna is rarely effected. More often, some fraction of a full wavelength is used, which will still resonate with a tuned section of the desired frequency. Common fractions are ½; ¼; ⅛ wavelength. To continue the example, the 1.23 foot long frequency is 14.76 inches long, which is too long for a small hand held device. If one eight wavelength is employed, then the antenna length would be (14.76).125=1.85 inches long, which is practical for various embodiments of the subject invention. Because it may be desirable to use the same antenna for transmitting, the above-mentioned calculations may be repeated to determine the transmission frequency and arrive at an optimal antenna length for that transmission frequency. For example, if the transmission frequency were 900 Megahertz, then a one-eighth wavelength antenna would be 1.64 inches long. In practice, a single antenna must often be compromised to facilitate both reception and transmission, so in this example, the difference between the two antenna lengths can be averaged to arrive at an antenna length that will resonate reasonably with both the reception and transmission frequencies. The final antenna length in this example would be the difference in length divided by two and then added to the shorter length; or ((1.85−1.64)/2)+1.64=1.745 inches. Thus, an antenna of 1.75 inches would suffice. In practice, other corrections are common in antenna design, including just about every shape and combination possible. With some designs, various corrections can be introduced to allow for other factors including antenna impedance. But the basic exercise of relating frequency, wavelength, and antenna length as described here remains as a starting point to determine an antenna length that may be suitable for a particular application.

Those of ordinary skill in the art will appreciate that the shape of the antenna element could also vary from thick to thin. Also, the location of the antenna could be located along one side of the cover member or along the top or bottom of the cover member, depending upon the application. It will be further appreciated that the antenna may be incorporated into an appropriately sized ornamental design shaped to mask it on the cover member. In one embodiment, to add protection to the antenna 50, a commercially available plastic film or overlay layer 56 that has an adhesive backing is applied over the antenna 50 and the cover 30. See FIG. 2. The plastic film may be entirely transparent, opaque or it may have both types of areas. Likewise, another piece of commercially available plastic film 59 may be placed over the portion of the tape 34 and the antenna portion 54 to further protect those elements as shown in FIG. 7.

FIGS. 1–7 illustrate one embodiment of the present invention. As can be seen in those Figures, the cover member 30 may be pivoted between a first position wherein it covers the keypad. See FIGS. 1–4. When the device is not in use, the cover member 30 is in the first position. If desired, a latching member 100 may be provided on the top surface 14 of the housing member 12 to engage the cover member 30 when it is in the first position. See FIGS. 4 and 6. When the user desires to use the device 10, the cover member 30 is pivoted to another position wherein the keypad is exposed. See FIGS. 5–7. A user commonly holds the pager 10 in the palm of the hand and may use his or her index finger to support the cover member 30 in the protruding position shown in FIGS. 5–7 to expose the keypad 16 and thereby position the antenna 50 to enhance reception and transmission.

In an embodiment depicted in FIGS. 17 and 18, a spring or biasing means may be employed to bias the cover member to an upright position. For example, in this embodiment, a spring 200 of the type shown in FIG. 19 is received on hinge pin 16' such that one leg 202 of the spring 200 abuts an inside surface of the cover member 30' and may be retained in abutting contact therewith by a piece of tape 204, adhesive, a molded boss, etc. Likewise, the other leg 206 of the spring 200 is in abutting contact with the housing 12' and may be retained in abutting contact by a piece of tape 208, adhesive, a molded boss, etc. It will be appreciated that such spring arrangement serves to bias the cover member 30' to the open position shown in FIGS. 18 and 19. To retain the cover member 30' in such upright position, stop members 220 may be molded on the upper surface of the housing 12' to abut bottom portions of the cover member 30' as shown. To retain the cover member 30' in a closed position, latch members 100' may be formed or otherwise provided on the housing 12' as shown. Thus, when the cover member 30' is unlatched from the latches 100', it is biased to an upright position by the spring 200. Those of ordinary skill in the art will readily appreciate that other types and constructions of springs and biasers may be used without departing from the spirit and scope of the present invention. For example, a coil spring (not shown) may be employed such that the spring provides electrical contact between and among the various components on the cover and in the device.

Figure 14:
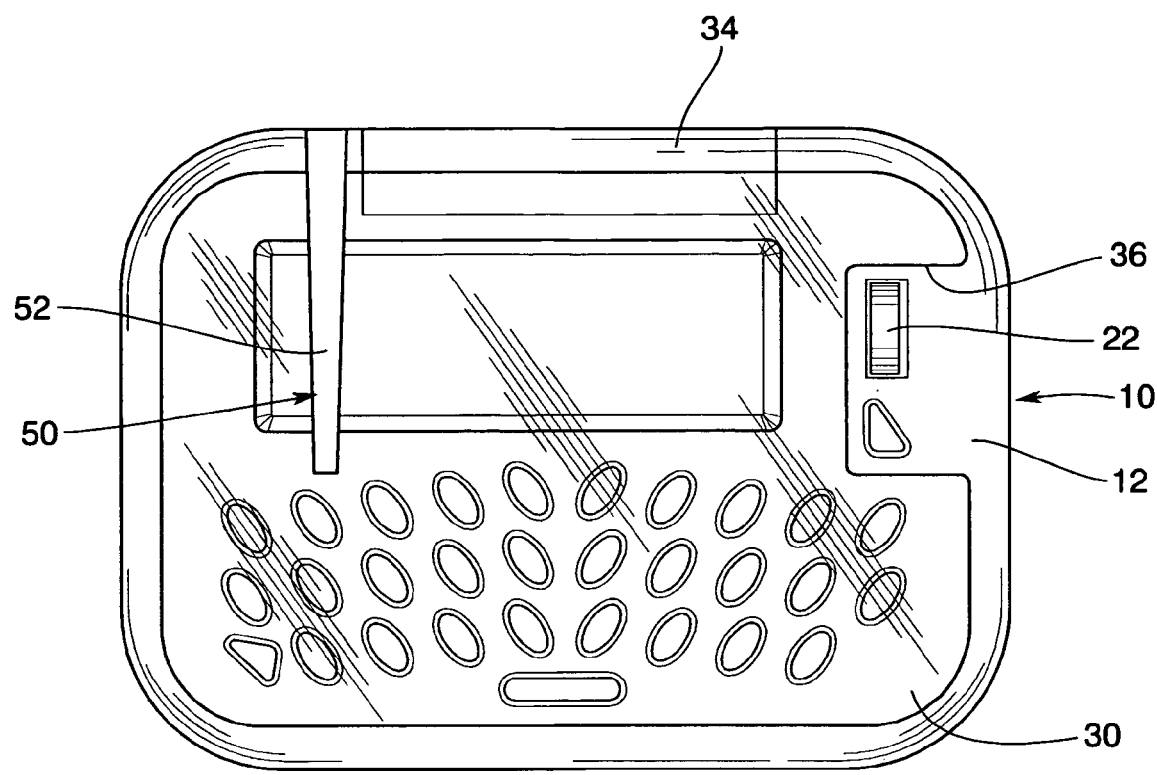
FIG. 14 is a top view of the portable wireless communication device and protector of FIG. 13.
Figure 15:
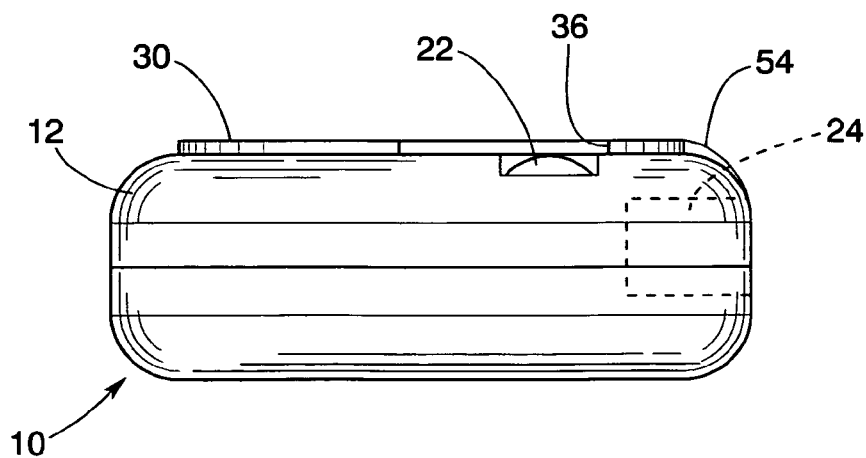
FIG. 15 is a right side elevational view of the portable wireless communication device and protector of FIGS. 13 and 14.
Figure 16:
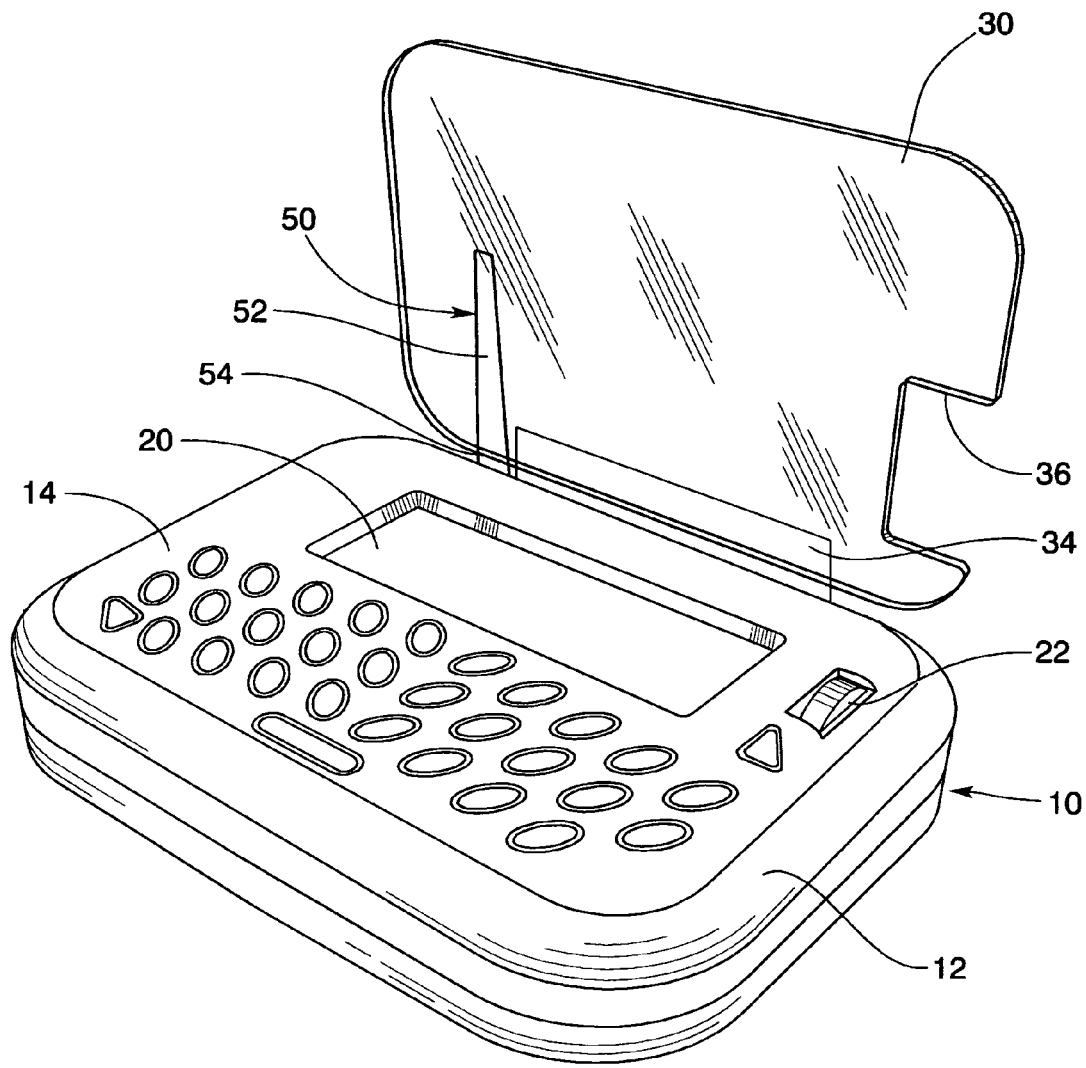
FIG. 16 is a perspective view of the portable wireless communication device of FIGS. 13–15 with the protector in a second position.
Figure 20:
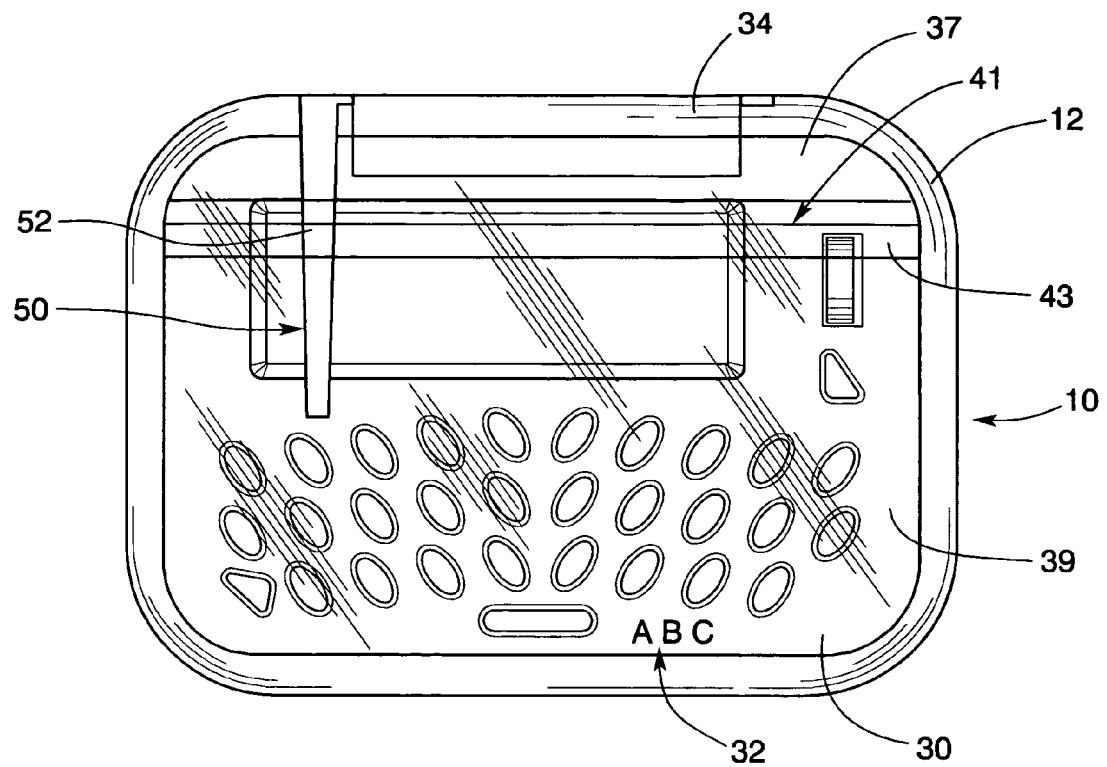
FIG. 20 is a top view of a portable wireless communication device with another embodiment of the protector of the present invention attached thereto in a first position.
Figure 21:
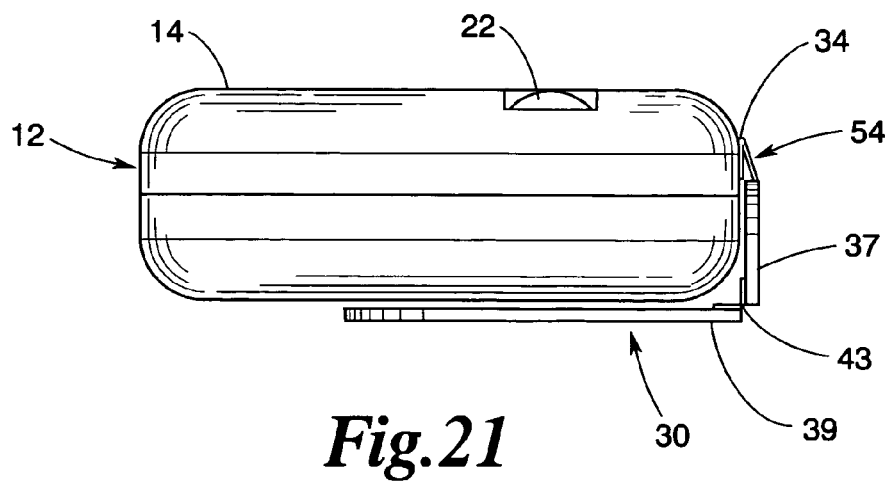
FIG. 21 is a right side elevational view of the portable wireless communication device and protector of FIG. 20 with the protector in a second position.

In another embodiment depicted in FIGS. 14 and 15, the cover member 30 may be provided in two segments 37 and 39 that are interconnected at their joint 41 with a flexible medium such as a piece of commercially available adhesive tape. Such arrangement permits the cover member 30 to be folded to a position wherein it is adjacent to the rear surface and bottom of the housing member 12 as shown in FIG. 15. In particular, in this embodiment, the cover member is fabricated from a first cover member portion 37 and a second cover member portion 39 that is attached to the first cover member portion 37 by a flexible joint member 43. Flexible joint member 43 may comprise a piece of adhesive tape, etc. As with other embodiments, a plastic film 56 may be applied over the antenna 50, the cover member 30, and/or the flexible joint member 34 to provide additional protection thereto.

Figure 22:
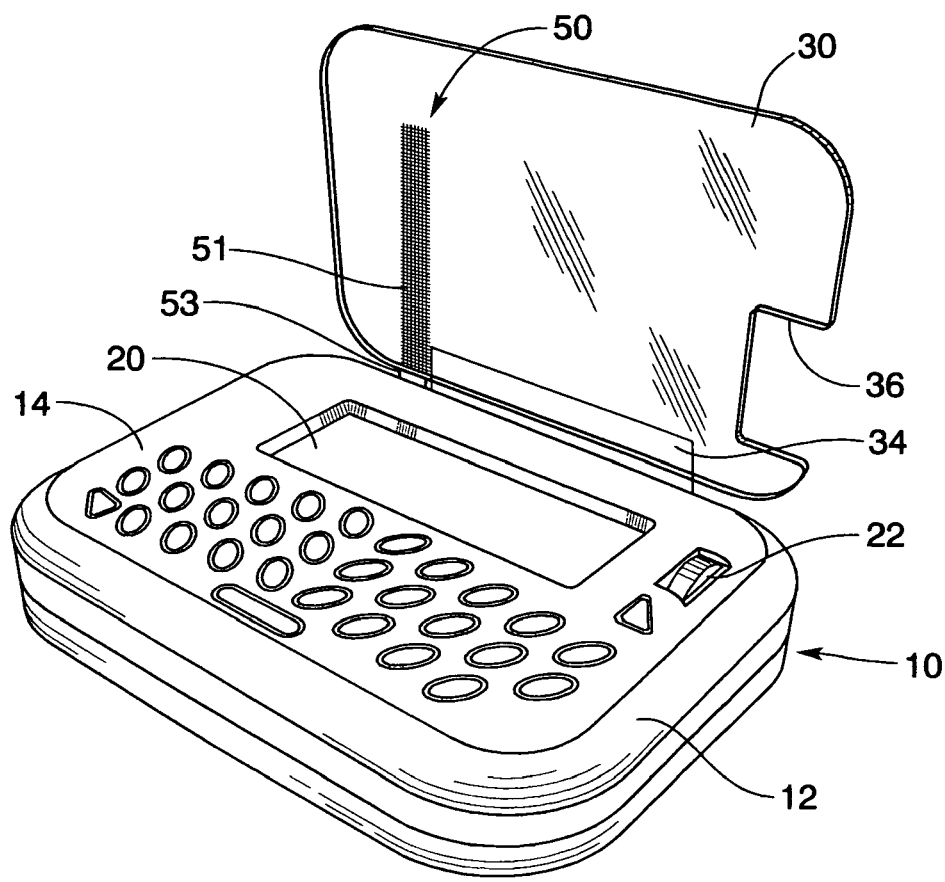
FIG. 22 is a perspective view of a portable wireless communication device with another protector of the present invention attached thereto.
Figure 23:
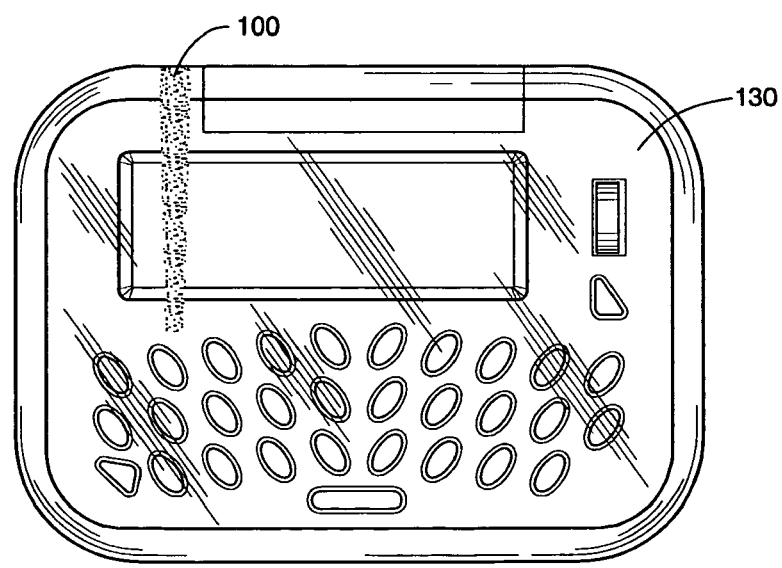
FIG. 23 is a top view of a portable wireless communication device and another protector of the present invention.

Another embodiment is depicted in FIGS. 22 and 23. As can be seen in those Figures, the antenna 50 comprises a brass or other metallic screen 51 that is embedded or otherwise attached to the cover member 30. The screen 51 may be attached to the rear surface 15 of the housing by conductive tape 53 or the screen itself may protrude out from the cover member 30 to be attached to the rear surface 15 of the housing by other conventional fastener arrangements such as adhesive, tape, etc. It is also conceivable that a wire or wires could be attached to the screen 51 and be electrically coupled to the appropriate components within the device 10. In such arrangements wherein the screen 51 is actually embedded in the cover member 30, it will be appreciated that the cover member may be fabricated from transparent material that has a desired color or hue.

It is conceivable that conductive particulate materials 100 may be embedded in the cover member 130 as shown in FIG. 23. Other embodiments may include, for example, covers made from transparent conductive plastics that could be arranged to have a conductive part thereby facilitating the same electronic effect as described above. Such cover members could be completely transparent, translucent, colored transparent, etc.

Thus, from the foregoing discussion, it is apparent that the various embodiments of the present invention solve many of the problems encountered when utilizing many different types of handheld communication devices. More specifically, the various embodiments of the present invention afford a novel and relatively inexpensive means for protecting various types of handheld communication devices such as interactive pagers and the like. The user can therefore safely store or carry the device in her pocket or in her purse without risking damage to the keypad or the inadvertent creation of a spurious message. Furthermore, various embodiments of the present invention provide a novel means for enhancing the device's reception and transmission capabilities. The cover members of the present invention are relatively inexpensive to manufacture and easy to install which enables the user to easily change them if they become marred or damaged or another version is desired. Those of ordinary skill in the art will, of course, appreciate that various changes in the details, materials and arrangement of parts which have been herein described and illustrated in order to explain the nature of the invention may be made by the skilled artisan within the principle and scope of the invention as expressed in the appended claims.

What is claimed is:

1. A protector for a portable wireless communication device that has a housing, a display, and a keypad and contains at least one signal processing circuit, said protector comprising:

a transparent cover pivotally attached to the housing by at least two hinges such that said cover is pivotable from a first position wherein it covers the keypad to another position wherein the keypad is exposed and the cover is folded around a back portion of the portable wireless communication device and further acts as a stand for propping up the portable wireless communication device at an angle on a surface, and wherein the housing includes a scrolling means proximate to the keypad, wherein the scrolling means is not covered when the cover is in the first position thereby enabling a user to use the scrolling means to perform a scrolling operation viewable on the display through the cover when the cover is in the first position; and a planar antenna attached to the exterior of both the cover and the housing where the planar antenna is capacitively coupled to the signal processing circuit such that the planar antenna is electromagnetically coupled to the signal processing circuit without being physically coupled to the signal processing circuit.

2. The protector of claim 1 wherein said cover is pivotally attached to the housing by adhesive tape.

3. The protector of claim 1 wherein said antenna is laminated to said cover.

4. The protector of claim 3 wherein said antenna is fabricated from a metal tape.

5. The protector of claim 4 wherein said antenna is fabricated from aluminum tape.

6. The protector of claim 1 wherein said antenna comprises conductive particulate material attached to said cover.

7. The protector of claim 6 wherein said conductive particulate material is embedded in said cover.

8. The protector of claim 1 further comprising an overlay layer covering at least a portion of said antenna.

9. The protector of claim 1 wherein said antenna is embedded in said cover.

10. The protector of claim 9 wherein said antenna comprises a metallic screen.

11. The protector of claim 1 wherein said cover comprises:
   a first cover portion;
   a second cover portion; and
   a flexible joint interconnecting the first cover portion with the second cover portion.

12. The protector of claim 1 wherein the housing has a first color and said cover has said first color.

13. The protector of claim 1 wherein said cover has indicia provided thereon.

14. The protector of claim 1 wherein said cover only covers a portion of said keypad when said cover is in said first position.

15. The protector of claim 1 further comprising a biaser between said cover and a portion of the housing.

16. A method of protecting at least a portion of a keypad supported in the housing of a portable wireless communication device, the housing comprising a display, said method comprising:

demountably securing by hand a transparent cover to the housing with at least two hinges such that the cover may be selectively pivoted from a first position wherein at least a portion of the keypad is covered to another position wherein the at least a portion of the keypad is exposed and the cover is folded around a back portion of the portable wireless communication device and acts as a stand for propping up the portable wireless communication device at an angle on a surface, and wherein the housing further includes a scrolling means proximate to the keypad, wherein the scrolling means is not covered when the cover is in the first position thereby enabling a user to use the scrolling means to perform a scrolling operation viewable on the display through the cover when the cover is in the first position, wherein the portable wireless communication device has signal-transmitting circuitry and signal-receiving circuitry therein and wherein said method comprises enhancing an ability of the signal-receiving circuitry to receive signals and enhancing an ability of the signal transmitting circuitry to transmit signals wherein said enhancing comprises capacitively coupling an antenna to the signal-receiving circuitry and said signal-transmitting circuitry such that the antenna is electromagnetically coupled to the signal-receiving circuitry and the signal-transmitting circuitry without being physically coupled to the signal-receiving circuitry and signal transmitting circuitry.

17. The method of claim 16 wherein said antenna is coupled to the cover and to the housing.

* * * * *